(12) United States Patent
Lv et al.

(10) Patent No.: US 9,360,887 B2
(45) Date of Patent: Jun. 7, 2016

(54) DISPLAY DEVICE

(71) Applicant: Shenzhen China Star Optoelectronics Technology Co., Ltd., Shenzhen, Guangdong (CN)

(72) Inventors: Chengling Lv, Guangdong (CN); Yajun Yu, Guangdong (CN); Guofu Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 146 days.

(21) Appl. No.: 14/374,522

(22) PCT Filed: Jul. 2, 2014

(86) PCT No.: PCT/CN2014/081435
§ 371 (c)(1),
(2) Date: Jul. 24, 2014

(87) PCT Pub. No.: WO2015/188413
PCT Pub. Date: Dec. 17, 2015

(65) Prior Publication Data
US 2015/0355675 A1    Dec. 10, 2015

(30) Foreign Application Priority Data
Jun. 9, 2014 (CN) .......................... 2014 1 0252272

(51) Int. Cl.
*F16M 11/04* (2006.01)
*G06F 1/16* (2006.01)
*F16M 11/22* (2006.01)
*G06F 1/18* (2006.01)

(52) U.S. Cl.
CPC ............. *G06F 1/1601* (2013.01); *F16M 11/04* (2013.01); *F16M 11/22* (2013.01); *G06F 1/181* (2013.01)

(58) Field of Classification Search
CPC ...... G06F 1/1601; G06F 1/181; F16M 11/04; F16M 1/22
See application file for complete search history.

(56) References Cited

U.S. PATENT DOCUMENTS

| | | | | |
|---|---|---|---|---|
| 6,332,690 B1 * | 12/2001 | Murofushi | ........ | G02F 1/133305 349/64 |
| 8,228,667 B2 * | 7/2012 | Ma | ........ | G06F 1/1652 361/679.01 |
| 9,081,540 B1 * | 7/2015 | Cho | ........ | G06F 1/1601 |
| 9,182,620 B1 * | 11/2015 | Yu | ........ | G02F 1/133308 |
| 2009/0096965 A1 * | 4/2009 | Nagata | ........ | G02F 1/133305 349/103 |
| 2011/0096262 A1 * | 4/2011 | Kikuchi | ........ | G09F 9/301 349/58 |

(Continued)

*Primary Examiner* — David M Sinclair
*Assistant Examiner* — Robert Brown
(74) *Attorney, Agent, or Firm* — Andrew C. Cheng

(57) ABSTRACT

A display device includes a base (1) and a curvature-adjustable display screen (3) mounted on the base (1). The base (1) includes two supporting legs (11) and a connecting part (15) disposed therebetween. Each of the supporting legs (11) includes a placing part (111) and a mounting part (113) upwardly extending therefrom. The mounting parts (113) are respectively connected to two sides of the display screen (3). The connecting part (15) is disposed between the two placing parts (111) and capable of allowing the two placing parts (111) rotatable relative to each other along with a change of curvature of the display screen (3) and thereby resulting in the base (1) variable with the change of curvature of the display screen (3). Therefore, the curvature of the display screen (3) can be adjusted according to user's viewing needs and the convenience of product use is increased.

12 Claims, 5 Drawing Sheets

(56) References Cited

U.S. PATENT DOCUMENTS

| | | | | |
|---|---|---|---|---|
| 2011/0187681 A1* | 8/2011 | Kim | ................ | G06F 1/1652 345/204 |
| 2011/0249425 A1* | 10/2011 | Aurongzeb | ............ | F21V 14/02 362/102 |
| 2012/0281367 A1* | 11/2012 | He | ................ | H05K 5/02 361/728 |
| 2012/0320509 A1* | 12/2012 | Kim | ................ | B32B 17/064 361/679.01 |
| 2013/0037228 A1* | 2/2013 | Verschoor | ............ | G06F 1/1652 160/377 |
| 2013/0114193 A1* | 5/2013 | Joo | ................ | F16M 11/08 361/679.01 |
| 2013/0155655 A1* | 6/2013 | Lee | ................ | H05K 5/03 362/97.1 |
| 2013/0207946 A1* | 8/2013 | Kim | ................ | G09G 3/3225 345/204 |
| 2013/0265765 A1* | 10/2013 | Liang | ................ | H05K 5/0208 362/249.02 |
| 2013/0329162 A1* | 12/2013 | Fujii | ................ | H05K 7/14 349/58 |
| 2013/0329422 A1* | 12/2013 | Park | ................ | G02F 1/133305 362/233 |
| 2014/0140023 A1* | 5/2014 | Lee | ................ | H05K 5/03 361/755 |
| 2014/0226266 A1* | 8/2014 | Kang | ................ | H01L 51/0097 361/679.01 |
| 2014/0268584 A1* | 9/2014 | Song | ................ | H05K 7/02 361/728 |
| 2014/0314999 A1* | 10/2014 | Song | ................ | G06F 1/1601 428/174 |
| 2014/0376163 A1* | 12/2014 | Song | ................ | H04N 5/64 361/679.01 |

\* cited by examiner

DISPLAY DEVICE

TECHNICAL FIELD

The present invention relates to the field of display, and particularly to a display device with a curvature-adjustable display screen.

DESCRIPTION OF RELATED ART

Liquid crystal display (LCD) device and organic light-emitting diode (OLED) display device are two types of rapid development of display devices.

The LCD display device has several advantages of body slim, electricity-saving and radiation free, etc. and thus has been widely used. Such as LCD TVs, mobile phones, personal digital assistants (PDA), digital cameras, desktop or laptop computer screens, and so on.

The OLED display device has a self-emissive characteristic and uses extremely thin organic material coatings and glass substrates. The organic materials would emit light when a current pass therethrough and thereby achieving display function.

In recent years, with the development of display technology, various manufactures have launched curved display devices such as curved TVs. Generally, the curved display device can provide better viewing experience from the center to the edge of screen while the traditional flat display device always has an unsatisfactory display effect at the edge of screen. The curved display device has a curve design for its whole screen and can provide a wide panoramic image effect. Regardless of the screen center or edges are able to bring the same visual enjoyment, and the off-axis viewing distortion in the situation of close viewing can be reduced. Moreover, the curved display device can stretch the user's viewing distance to thereby achieve a better viewing experience. Compared with the traditional flat display device, the curved display device has the following advantages of: (1) product differentiation; (2) wider viewing angle; and (3) reduced distortion of close viewing. Accordingly, the curved display device can provide a wider viewing angle and a wider panoramic image than the traditional flat display device, letting the whole sense of reality of image more strongly.

Nowadays, the LCD display device and OLED display device both can be made into curved display devices. However, the curvature of display screen is fixed and a structure of the base for mounting the display screen also is fixed. FIG. 1 is a schematic view of a conventional display device. The conventional display device includes a base 100 and a curvature-constant display screen 300 mounted on the base 100. The base 100 includes a placing part 110 and two mounting parts 130 upwardly extending from two ends of the placing part 110. The placing part 110 of the base 100 is a single member and thus its structure is fixed and unchanged. If the conventional base 100 is used for mounting a curvature-adjustable display screen, the structure of the base 100 is fixed and thus could not change along with the change of curvature of the display screen, which hinders the change of curvature of the display screen, so that the curvature of display screen could not be adjusted according to the viewing needs of user, the display effect wanted by the user could not be achieved consequently.

SUMMARY

An objective of the present invention is to provide a display device, a base of which can vary with a change of curvature of a display screen, and thereby the curvature of display screen can be adjusted according to viewing needs of user and the convenience of product use can be increased.

In order to achieve the above objective, a display device according to an exemplary embodiment of the present invention includes a base and a curvature-adjustable display screen mounted on the base. The base includes two supporting legs and a connecting part disposed between the two supporting legs. Each of the supporting legs includes a placing part and a mounting part upwardly extending from the placing part. The mounting parts are respectively connected to two sides of the display screen. The connecting part is disposed between the two placing parts and capable of allowing the two placing parts rotatable relative to each other along with a change of curvature of the display screen.

In an exemplary embodiment, the placing parts are curved.

In an exemplary embodiment, the connecting part includes a convex pole and a concave hole respectively formed at opposite two ends of the two placing parts, and a size of the concave hole is larger than that of the convex pole.

In an exemplary embodiment, the concave hole is cylindrical, and the convex pole is cylindrical.

In an exemplary embodiment, the convex pole is outwardly extended from an end of one of the placing parts, and the concave hole is inwardly recessed at an end of the other one of the placing parts.

In an exemplary embodiment, an engaging degree of the convex pole with the concave hole varies with the change of curvature of the display screen, when the display screen is in a curved state with a maximum curvature, the convex pole is partially inserted into the concave hole, and when the display screen is in a flat state with a minimum curvature, the convex pole is completely inserted into the concave hole.

In an exemplary embodiment, the connecting part includes an elastic member disposed at opposite two ends of the two placing parts.

In an exemplary embodiment, the elastic member is correspondingly deformed along with the change of curvature of the display screen. When the display screen is in a curved state with a maximum curvature, a stretching deformation of the elastic member is at a maximum value, and when the display screen is in a flat state with a minimum curvature, the stretching deformation of the elastic member is at a minimum value or zero.

In an exemplary embodiment, the elastic member includes latching holes at two ends thereof engaged with the placing parts. Each of the placing parts is formed with a latching head at an end thereof engaged with the elastic member. The placing parts are connected with the elastic member by snapping the latching heads into the latching holes. Each latching hole includes an opening and an inner bore connecting the opening, a size of the opening is smaller than that of the inner bore. Each latching head includes a head portion and a neck portion connecting the head portion, a size of the head portion is larger than that of the neck portion. The head portion is disposed in the inner bore of the latching hole, and the neck portion is disposed in the opening of the latching hole.

In an exemplary embodiment, the display screen is fixedly connected to the mounting parts by screws.

Moreover, another display device according to an exemplary embodiment of the present invention includes a base and a curvature-adjustable display screen mounted on the base. The base includes two supporting legs and a connecting part disposed between the two supporting legs. Each of the supporting legs includes a placing part and a mounting part upwardly extending from the placing part. The mounting parts are respectively connected to two sides of the display screen. The connecting part is disposed between the two placing parts and capable of allowing the two placing parts rotatable relative to each other along with a change of curvature of the display screen. The placing parts are curved. The connecting part includes a convex pole and a concave hole respectively at opposite two ends of the two placing parts. A size of the concave hole is larger than that of the convex pole. The concave hole is cylindrical, and the convex pole is cylindrical. The convex pole is outwardly extended from an end of one of the placing parts, and the concave hole is inwardly recessed at an end of the other one of the placing parts. An engaging degree of the convex pole with the concave hole varies with the change of curvature of the display screen. When the display screen is in a curved state with a maximum curvature, the convex pole is partially inserted into the concave hole, and when the display screen is in a flat state with a minimum curvature, the convex pole is completely inserted into the concave hole. The display screen is fixedly connected to the mounting parts by screws.

Sum up, the display device according to the present invention is with a base including two placing parts and a connecting part disposed between the two placing parts, the connecting part is capable of allowing the two placing parts rotatable relative to each other along with the change of curvature of the display screen in order to adapt the change of curvature of the display screen. That is, the base can vary with the change of curvature of the display screen and thereby the curvature of display screen can be conveniently adjusted according to viewing needs of user, the convenience of product use is increased. Furthermore, the structure of the base is relatively simple and easy to realize.

BRIEF DESCRIPTION OF THE DRAWINGS

The above embodiments will become more readily apparent to those ordinarily skilled in the art after reviewing the following detailed description and accompanying drawings.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

Figure 1:
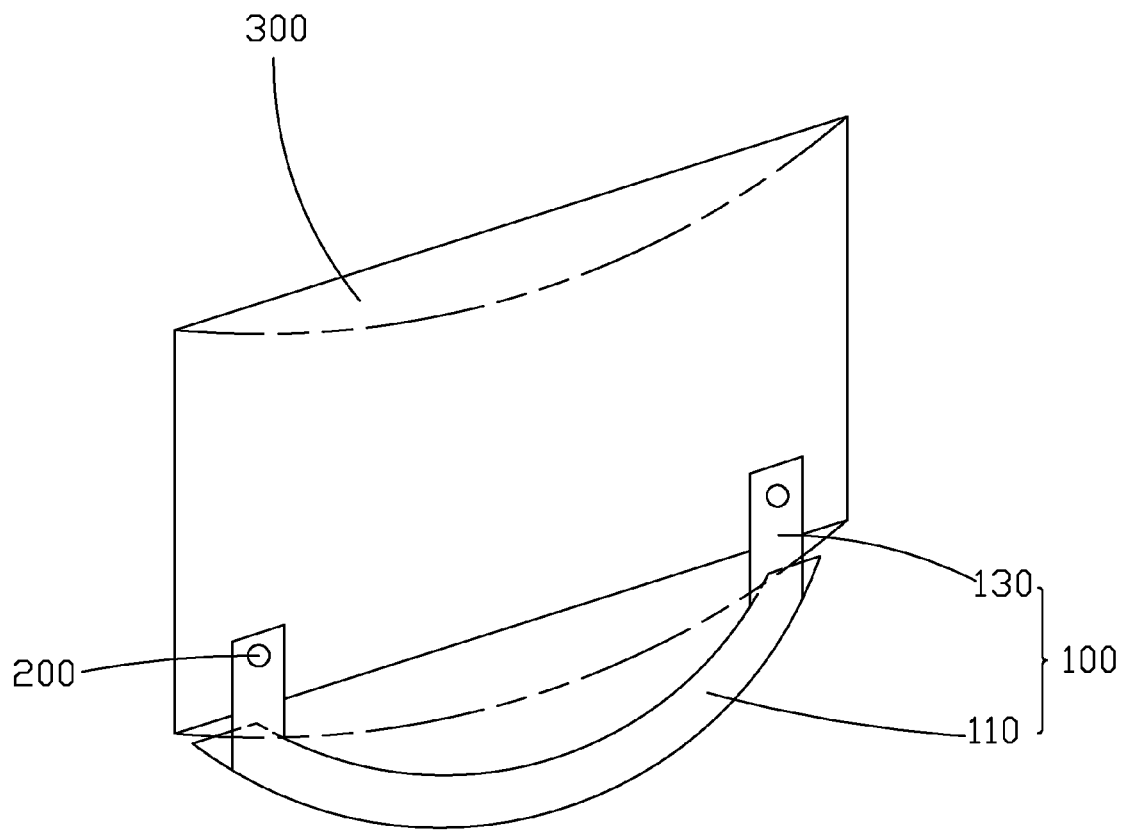
FIG. 1 is a schematic structural view of a conventional display device.
Figure 2:
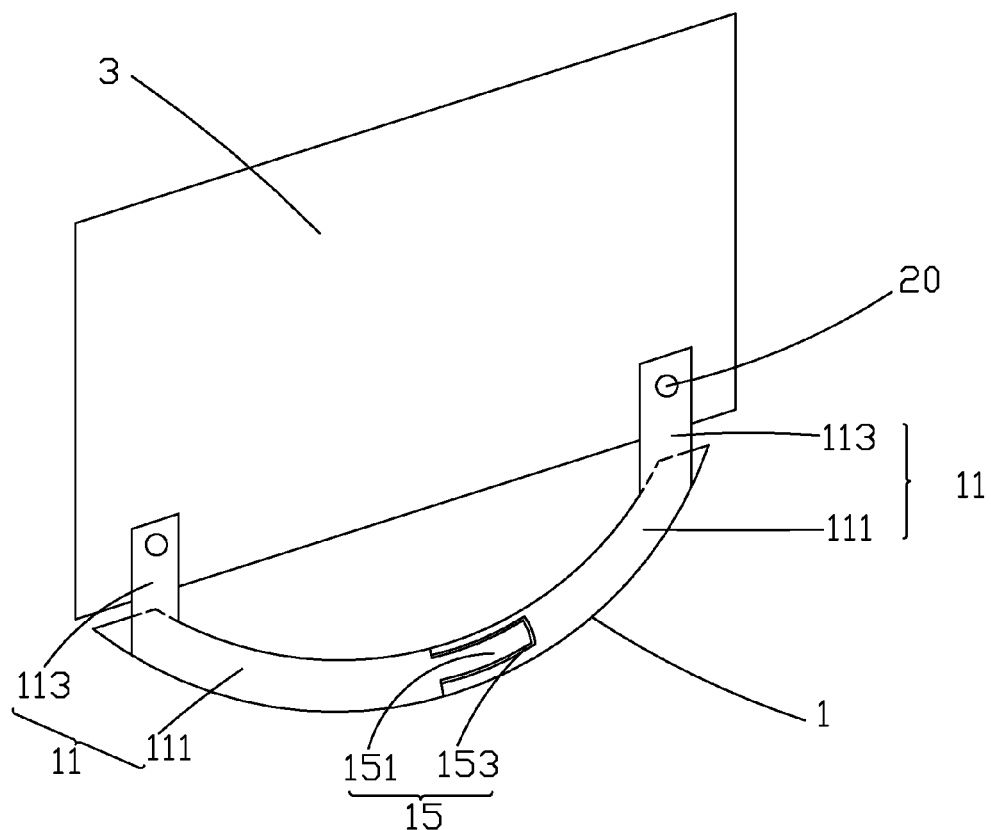
FIG. 2 is a schematic structure view of a display device with a display screen in a flat state according to a first embodiment of the present invention.
Figure 3:
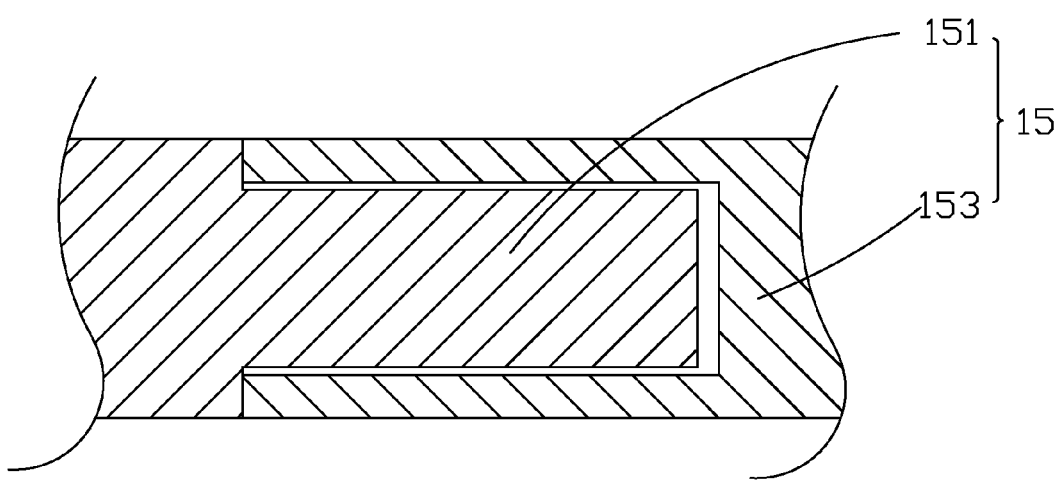
FIG. 3 is a schematic partial sectional view of a connecting part of the display device according to the first embodiment of the present invention.
Figure 4:
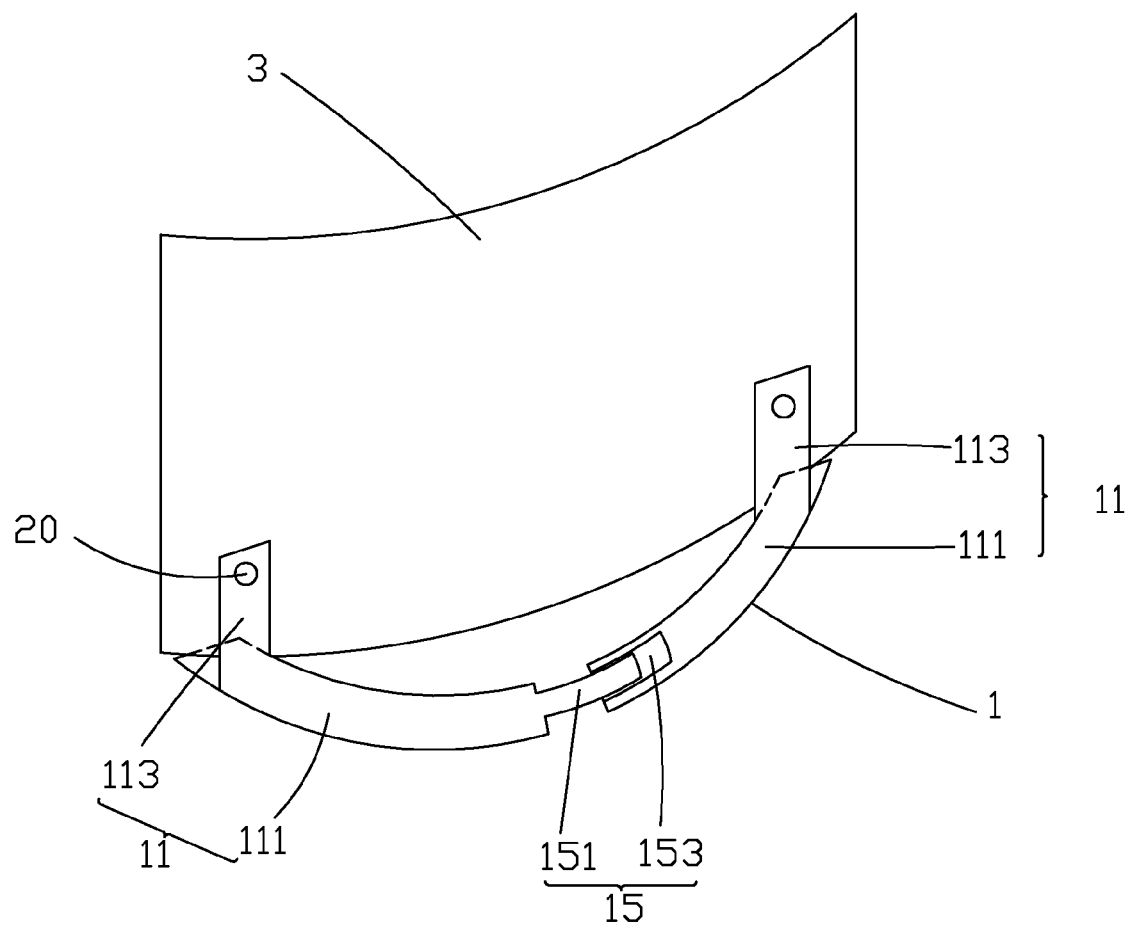
FIG. 4 is a schematic structure view of the display device with the display screen in a curved state according to the first embodiment of the present invention.

The display device according to the present invention can be applied as a LCD display device as well as an OLED display device. Referring to FIGS. 2 through 4, which illustrate a display device according to a first embodiment of the present invention. The display device includes a base 1 and a curvature-adjustable display screen 3 mounted on the base 1. The base 1 includes two supporting legs 11 and a connecting part 15 disposed between the two supporting legs 11. Each of the supporting legs 11 includes a placing part 111 and a mounting part 113 upwardly extending from the placing part 111. The mounting parts 113 respectively are connected to two sides of the display screen 3. The connecting part 15 is disposed between two placing parts 111 and capable of allowing the two placing parts 11 rotatable relative to each other along with a change of curvature of the display screen 3.

The display screen 3 is fixedly connected to the mounting parts 113 by screws 20.

Each of the placing parts 111 is curved.

The connecting part 15 includes a convex pole 151 and a concave hole 153 respectively disposed at opposite two ends of the two placing parts 111. The convex pole 151 and the concave hole 153 are engaged with each other. A size of the concave hole 153 is larger than that of the convex pole 151. The convex pole 151 is outwardly extended from an end of one of the placing parts 111. The concave hole 153 is inwardly recessed at an end of the other one of the placing parts 111. Preferably, the concave hole 153 is cylindrical, and the convex pole 151 is cylindrical.

The engaging degree of the convex pole 151 with the concave hole 153 varies with the change of curvature of the display screen 3. As illustrated in FIG. 2, when the display screen 3 is in a flat state with a minimum curvature, the convex pole 151 is completely inserted into the concave hole 153. As illustrated in FIG. 4, when the display screen 3 is in a curved state, the placing parts 111 respectively bring the convex pole 151 and the concave hole 153 to make a relative movement therebetween, and the convex pole 151 is partially inserted into the concave hole 153. Along with the change of curvature of the display screen 3, an insertion length of the convex pole 151 into the concave hole 153 is varied correspondingly. When the display screen 3 is in a curved state with a maximum curvature, the insertion length of the convex pole into the concave hole 153 is at a minimum value.

The connecting part 15 is capable of allowing the base 1 to vary with the change of curvature of the display screen 3, and thereby the curvature of display screen 3 can be conveniently adjusted according to viewing needs of user.

Figure 5:
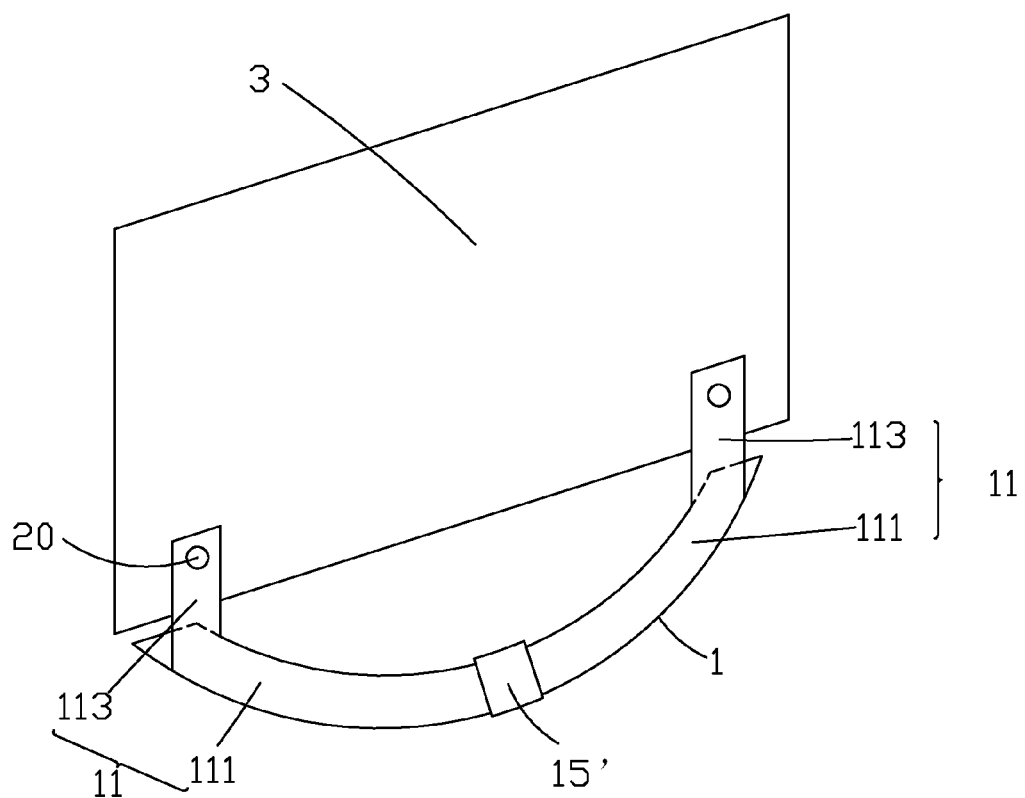
FIG. 5 is a schematic structure view of a display device with a display screen in a flat state according to a second embodiment of the present invention.
Figure 6:
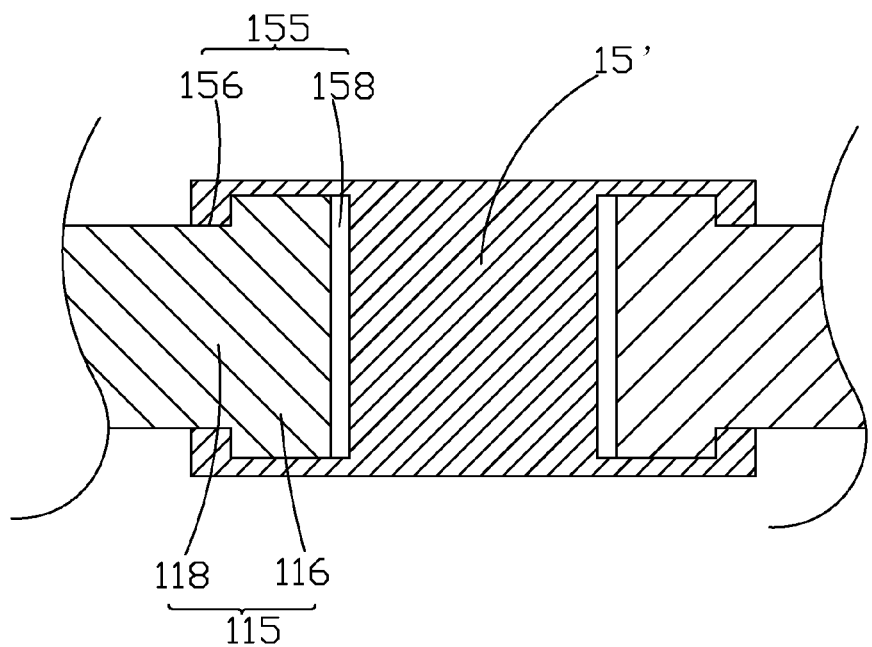
FIG. 6 is a schematic partial sectional view of a connecting part of the display device according to the second embodiment of the present invention.
Figure 7:
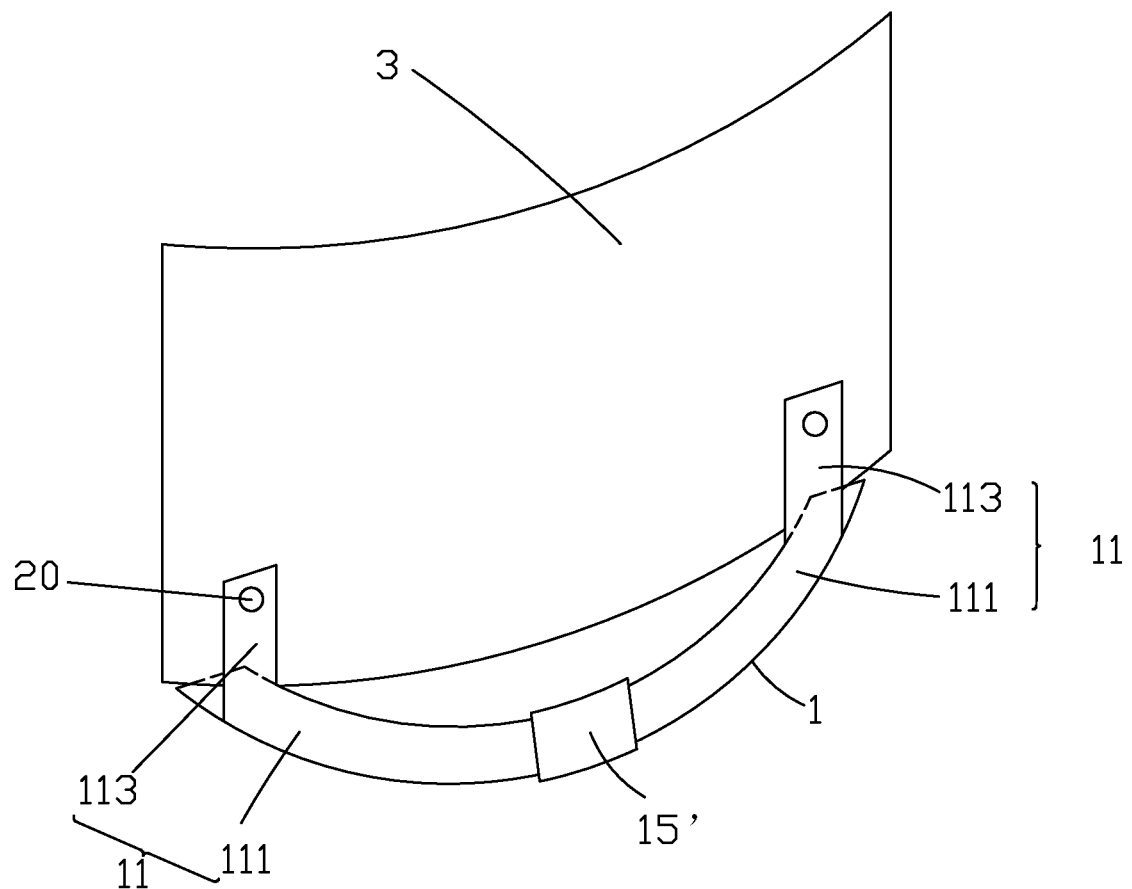
FIG. 7 is a schematic structure view of the display device with the display screen in a curved state according to the second embodiment of the present invention.

Referring to FIGS. 5 through 7, which illustrate a display device according to a second embodiment of the present invention. The display device includes a base 1 and a curvature-adjustable display screen 3 mounted on the base 1. The base 1 includes two supporting legs 11 and a connecting part 15' disposed between the two supporting legs 11. Each of the supporting legs 11 includes a placing part 111 and a mounting part 113 upwardly extending from the placing part 111. The mounting parts 113 respectively are connected to two sides of the display screen 3. The connecting part 15' is disposed between the two placing parts 111 and facilitates the two placing parts 111 to rotate relative to each other along with a change of curvature of the display screen 3.

The display screen is fixedly connected to the mounting parts 113 by screws 20.

Each of the placing parts 111 is curved.

The connecting part 15' is an elastic member disposed at opposite two ends of the two placing parts 111. The elastic member 15' is engaged and connected to the opposite two ends of the two placing parts 111.

Specifically, as illustrated in FIG. 6, the elastic member 15' is formed with latching holes 155 respectively at two ends of the placing parts 111 engaged with the elastic member 15'. Each of the placing parts 111 is formed with a latching head 115 at an end thereof engaged with the elastic member 15'. The placing parts 111 are connected with the elastic member 15' by snapping the latching heads 115 into the latching holes 155. Furthermore, each the latching hole 155 includes a opening 156 and an inner bore 158 connecting the opening 156. A size of the opening 156 is smaller than that of the inner bore 158. Each the latching head 115 has a head portion 116 and a neck portion 118 connecting the head portion 116. A size of the head portion 116 is larger than that of the neck portion 118. The head portion 116 is disposed in the inner bore 158 of the latching hole 155, and the neck portion 118 is disposed in the opening 156 of the latching hole 155.

The elastic member 15' is correspondingly deformed along with the change of curvature of the display screen 3. As illustrated in FIG. 5, when the display screen is in a flat state with a minimum state, the stretching effect of the latching head 115 applied to the latching hole 155 is at a minimum value or zero, and the stretched deformation of the elastic member 15' is at a minimum value or zero. As illustrated in FIG. 7, when the display screen 3 is in a curved state, the placing parts 111 respectively bring the latching heads 115 to stretch the latching holes 155. Along with the change of curvature of the display screen 3, the stretching effect of the latching heads 115 applied to the latching holes 155 varies correspondingly, and the stretched deformation of the elastic member 15' is changed correspondingly. When the display screen 3 is in a curved state with a maximum curvature, the stretching effect of the latching heads 115 applied to the latching holes 115 is at a maximum value, and the stretched deformation of the elastic member 15' is at a maximum value.

The elastic member 15', i.e., the connecting part 15' facilitates the base 1 to vary with the change of curvature of the display screen 3, and thereby the curvature of display screen 3 can be conveniently adjusted according to viewing needs of user.

In summary, the display device according to the present invention is with a base including two placing parts and a connecting part disposed between the two placing parts. The connecting part facilitates the two placing parts to rotate relative to each other along with the change of curvature of display screen in order to adapt the change of curvature of the display screen. That is, the base can vary with the change of curvature of the display screen, and thereby the curvature of the display screen can be conveniently adjusted according to viewing needs of user, the convenience of product use is increased. Furthermore, the structure of the base is relatively simple and easy to realize.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device comprising:
   a base and a curvature-adjustable display screen mounted on the base;
   wherein the base comprises two supporting legs and a connecting part disposed between the two supporting legs, each of the supporting legs comprises a placing part and a mounting part upwardly extending from the placing part, the mounting parts are respectively connected to two sides of the display screen, the connecting part is disposed between the two placing parts and capable of allowing the two placing parts rotatable relative to each other along with a change of curvature of the display screen;
   wherein the connecting part comprises a convex pole and a concave hole respectively formed at opposite two ends of the two placing parts, and a size of the concave hole is larger than that of the convex pole.

2. The display device according to claim 1, wherein the concave hole is cylindrical, and the convex pole is cylindrical.

3. The display device according to claim 1, wherein the convex pole is outwardly extended from an end of one of the placing parts, and the concave hole is inwardly recessed at an end of the other one of the placing parts.

4. The display device according to claim 1, wherein an engaging degree of the convex pole with the concave hole varies with the change of curvature of the display screen, when the display screen is in a curved state with a maximum curvature, the convex pole is partially inserted into the concave hole, and when the display screen is in a flat state with a minimum curvature, the convex pole is completely inserted into the concave hole.

5. A display device comprising:
   a base and a curvature-adjustable display screen mounted on the base;
   wherein the base comprises two supporting legs and a connecting part disposed between the two supporting legs, each of the supporting legs comprises a placing part and a mounting part upwardly extending from the placing part, the mounting parts are respectively connected to two sides of the display screen, the connecting part is disposed between the two placing parts and capable of allowing the two placing parts rotatable relative to each other along with a change of curvature of the display screen;
   wherein the connecting part comprises an elastic member disposed at opposite two ends of the two placing parts.

6. The display device according to claim 5, wherein the elastic member is correspondingly deformed along with the change of curvature of the display screen, when the display screen is in a curved state with a maximum curvature, a stretched deformation of the elastic member is at a maximum value, and when the display screen is in a flat state with a minimum curvature, the stretched deformation of the elastic member is at a minimum value or zero.

7. The display device according to claim 5, wherein the elastic member comprises latching holes at two ends thereof engaged with the placing parts, each of the placing parts is formed with a latching head at an end thereof engaged with the elastic member, the placing parts are connected with the elastic member by snapping the latching heads into the latching holes, each of the latching hole comprises an opening and an inner bore connecting the opening, a size of the opening is smaller than that of the inner bore, each of the latching heads comprises a head portion and a neck portion connecting the head portion, a size of the head portion is larger than that of the neck portion, the head portion is disposed in the inner bore of the latching hole, and the neck portion is disposed in the opening of the latching hole.

8. A display device comprising:
   a base and a curvature-adjustable display screen mounted on the base;
   wherein the base comprises two supporting legs and a connecting part disposed between the two supporting legs, each of the supporting legs comprises a placing part and a mounting part upwardly extending from the placing part, the mounting parts are respectively connected to two sides of the display screen, the connecting part is disposed between the two placing parts and capable of allowing the two placing parts rotatable relative to each other along with a change of curvature of the display screen;

wherein the placing parts are curved;

wherein the connecting part comprises a convex pole and a concave hole respectively at opposite two ends of the two placing parts, a size of the concave hole is larger than that of the convex pole;

wherein the concave hole is cylindrical, and the convex pole is cylindrical;

wherein the convex pole is outwardly extended from an end of one of the placing parts, and the concave hole is inwardly recessed at an end of the other one of the placing parts;

wherein an engaging degree of the convex pole with the concave hole varies with the change of curvature of the display screen, when the display screen is in a curved state with a maximum curvature, the convex pole is partially inserted into the concave hole, and when the display screen is in a flat state with a minimum curvature, the convex pole is completely inserted into the concave hole;

wherein the display screen is fixedly connected to the mounting parts by screws.

9. The display device according to claim 1, wherein the placing parts are curved.

10. The display device according to claim 1, wherein the display screen is fixedly connected to the mounting parts by screws.

11. The display device according to claim 5, wherein the placing parts are curved.

12. The display device according to claim 5, wherein the display screen is fixedly connected to the mounting parts by screws.

* * * * *